Dec. 31, 1968     J. E. KOPP     3,418,939
ROTARY PUMPS
Filed June 23, 1967
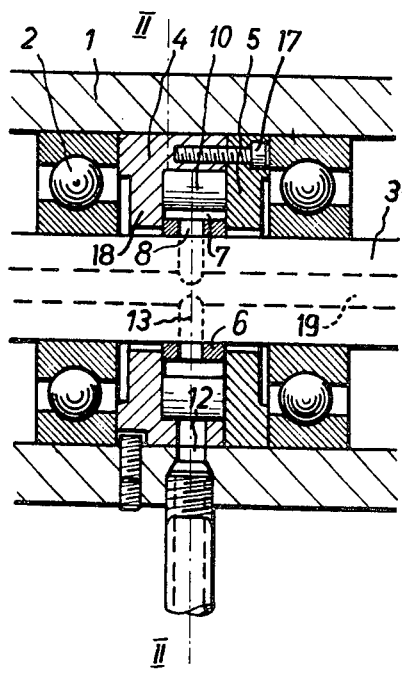
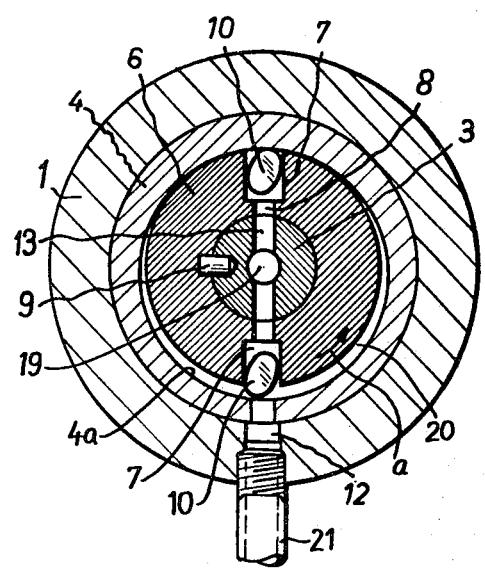
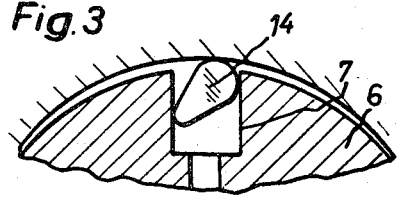
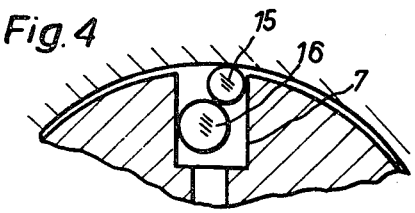

United States Patent Office 3,418,939
Patented Dec. 31, 1968

3,418,939
ROTARY PUMPS
Jean Ernst Kopp, Meyriez, Murten,
Fribourg, Switzerland
Filed June 23, 1967, Ser. No. 648,289
Claims priority, application Switzerland, June 30, 1966,
9,529/66
6 Claims. (Cl. 103—136)

ABSTRACT OF THE DISCLOSURE

A rotary pump having a cylindrical rotor mounted for rotation in an eccentric bore of the pump housing comprises fluid passages for the fluid to be delivered formed by radial slots in the rotor and extending inwardly from the periphery of the rotor. Movable valve elements are inserted in said radial slots and permit the fluid to flow radially inwards in said slots but prevent a flow of fluid radially outwards. Upon reversal of the direction of rotation of the pump rotor, said valve elements automatically adjust their position within said slots to again permit flow of fluid only in the direction from the periphery of the rotor inwards towards its center, so as to obtain unidirectional flow of the delivered fuel in both directions of rotation of the rotor.

---

This invention relates to rotary pumps of the type having a cylindrical rotor mounted within an eccentric bore of the pump casing, said rotor being provided with radial slots, extending inwardly from the cylindrical periphery of the rotor and containing movable valve elements, and the fluid to be delivered passing radially inwards through said slots, but being prevented by said valve elements from passing radially outwards through the slots.

Known rotary pumps of this type are provided with special valve structures in order to prevent passage of the fluid from the inside towards the periphery of the rotor, and when the direction of rotation of the rotor is reversed, the direction of flow of the fluid through the radial slots also is reversed, so that a reversal of the direction of rotation is not possible when a unidirectional flow of the delivered fluid is desired, without providing special means for directing the flow.

It is an object of the invention to provide a rotary pump of the above mentioned type which avoids these inconveniences.

According to the invention a rotary pump having a cylindrical rotor mounted for rotation in an eccentric bore of a pump casing, the rotor being provided with slots extending radially inwards from the cylindrical periphery thereof, comprises movable valve elements inserted in said slots in frictional sliding engagement with the internal surface of said bore to divide the clearance between the rotor and the internal surface of said eccentric bore into suction and pressure spaces and to form a seal therebetween, said valve elements being operative to permit flow of fluid to be delivered from the pressure spaces externally of the rotor radially inwards through said slots but preventing flow of fluid in opposite direction from the inside of the rotor towards said clearance between the rotor and the eccentric bore, and upon reversal of the direction of rotation of said rotor said movable valve elements owing to frictional engagement with the internal surface of said bore, automatically change their position, so that the flow of fluid radially inwards through said slots remains on the side of said valve elements facing the pressure space of said clearance independently of the directions of rotation of the rotor and the pump delivers fluid in the same direction of flow in both directions of rotation of said rotor.

An example of a rotary pump according to the invention is illustrated in the accompanying drawings, in which FIGURE 1 is an axial section through a built-in rotary pump, according to the invention, FIGURE 2 is a transverse section along the line II—II of FIGURE 1, FIGURE 3 represents a modification of a valve element, and FIGURE 4 represents a further modification of the valve element.

Referring to FIGURES 1 and 2, a portion 1 of a machine or gear which has to be equipped with a pump according to the invention carries two spaced ball bearings 2 which support the pump shaft 3. A pump casing 4 is arranged between the two ball bearings and provided with an eccentric bore 4a which is closed towards one side by a cover member 5 secured to the casing 4 by screws 17. In the space between the cover member 5 and a radially directed flange 18 of the pump casing the rotor 6 is secured of the rotor is provided with two rotor 6 is secured to the shaft 3 by means of pins 9. The cylindrical surface of the rotor is provided with two diametrically opposite radially extending slots 7. The shaft 3 is provided with an axial bore 19, and the two slots 7 of the rotor are connected by aligned bores 8 in the rotor and 13 in the shaft with the central axial bore 19 of the shaft. In each radial slot 7 a valve element 10 is arranged which is of elliptical or oval shape in cross section and which, under the action of centrifugal force, abuts against and frictionally engages the eccentric bore 4a upon rotation of the rotor 6. A duct 12 in the pump casing 4 and frame member 1 opens into the sickle shaped clearance space 20 between the rotor 6 and bore 4a and communicates with a suction conduit 21 of the fluid to be pumped.

The described pump operates as follows. When the shaft 3 rotates, the valve elements 10 under the action of the centrifugal force abut against the surface of the bore 4a and owing to friction of the elements 10 along the bore, they will assume an inclined position as shown in FIGURE 2 and will be applied with opposite sides against the opposite radially directed parallel faces of the slots 7. The elements 10 accordingly act as valves and close the space of the slots 7 at the inside of the elements 10. Through the suction conduit 21 and duct 12, fluid is drawn into the space 20, the rotor being supposed to turn in the direction of the arrow a. As soon as a valve element 10 passes the opening of the suction duct 12 into the clearance space 20, the fluid in the space 20 at the right side of the element 10 in FIGURE 2 is spaced under compression and acts on the valve element 10. The smaller, transverse diameter of the valve elements is less than the distance between the two parallel sidewalls of the slots 7, so that the lower element 10 in FIGURE 2 will slightly tilt by the action of the fluid pressure and will be lifted off from contact with the right hand side face of the slot 7, so that fluid can pass into the slot and through the duct 8 into the central delivery duct 13 of the shaft 3.

The clearance between the rotor 6 and the bore 4a of the casing 4 is of such radial width that always a major portion of the elements 10 will remain within the slots 7. The surface area of the element 10 subjected to fluid pressure is larger on the inner side of the slot 7 than on the outer side of the slot, because, as seen in FIGURE 2, fluid pressure in the sickle-shaped space 20 acts only on the portion of the surface of the lower element 10 between the points of contact of this element with the bore 4a and with the right hand face of the slot 7, while at the inside of the slot, the whole surface area between the two points of contact of the element 10 with the faces of the slot is exposed to fluid pressure. Owing to the action of the fluid pressure, the resulting pressure component acts radially outwards on the elements 10 and this component is added to the centrifugal force acting on the elements 10, so that the elements 10 during operation of the pump will remain always in sliding contact with the bore 4a, for any delivery pressure of the pump. During the suction period of the pump when no external pressure acts on the element 10, this latter again closes the slot 7, so that no fluid can flow back into the suction space.

When the direction of rotation of the shaft 3 is reversed, the valve elements 10 are automatically tilted owing to their frictional engagement of the bore 4a and the pump operates as before, the fluid being again delivered on the pressure side of the valve element 10 from the external side of the rotor inwardly through the slots 7 and ducts 8.

FIGURE 3 represents a modified valve element 14 which is pear-shaped in cross section, but operates in the same manner as the valve elements 10 of FIGURE 2.

FIGURE 4 represents a further modified valve element arrangement comprising two rolls 15 and 16 having different diameters. Operation of these rolls is the same as that of the valve elements 10 and 14 in FIGURES 2 and 3. Due to centrifugal force and fluid pressure, the two rolls are urged radially outwards in the slot 7 and prevent any flow of fluid outwards through the slot, independently of the direction of rotation of the rotor.

The represented pump structure is intended to be used as a built-in pump in a machine unit, but it is to be understood that the pump could also be constructed as an independent unit. The number of slots and valve elements can vary and the pump may be used for delivering liquid or gaseous media.

The described pump structure has the following advantages. The structure is simple, it comprises few parts which are easy to manufacture.

No springs for pressing the valve elements on their seats are required.

The pump is reversible without requiring any additional members, such as valves and the like.

The pump has small dimensions and can be mounted on existing shafts between normal ball bearings.

The pump can deliver fluid directly to a rotating shaft, for example to feed oil to a shaft without requiring the provision of oil feed channels or corrugations in the shaft.

The flow of the fluid delivered is continuous; the fluid is not queezed or compressed, thus permitting the delivery of delicate fluids without damage, and the pump operates at a high efficiency.

I claim:

1. A rotary pump having a cylindrical rotor mounted for rotation in an eccentric bore of the pump casing, the rotor being provided with slots extending radially inwards from the cylindrical periphery thereof, wherein the improvement comprises movable valve elements inserted in said slots in frictional sliding engagement with the internal surface of said bore to divide the clearance between the rotor and the internal surface of said eccentric bore into suction and pressure spaces and to form a seal therebetween, said valve elements being operative to permit flow of fluid to be delivered from the pressure spaces externally of the rotor radially inwards through said slots but preventing flow of fluid in opposite direction from the inside of the rotor towards said clearance between the rotor and the eccentric bore, and upon reversal of the direction of rotation of said rotor, said movable valve elements owing to frictional engagement with the internal surface of said bore, automatically change their position, so that the flow of fluid radially inwards through said slots remains on the side of said valve elements facing the pressure space of said clearance independently of the directions of rotation of the rotor and the pump delivers fluid in the same direction of flow in both directions of rotation of said rotor.

2. A rotary pump according to claim 1, in which said rotor is formed by an annular body mounted on a rotatable shaft, said shaft being provided with a central bore communicating with said radial slots in the rotor.

3. A rotary pump according to claim 1, in which said radial slots are provided with opposite parallel side walls and said valve elements are oblong bodies projecting from said slots by the action of centrifugal force for engaging the internal surface of said eccentric bore, said bodies having a diameter in transverse direction which is less than the distance between the parallel side walls of said slots so as to be able to tilt within the slots, whereby fluid pressure in the pressure space of said clearance acts to tilt said bodies and provide a passage for the flow of fluid radially inwards through said slots, but fluid pressure acting on the inner side of said bodies urges the bodies in tight engagement with the side walls of said slots to prevent passage of fluid radially outwards in said slots.

4. A rotary pump according to claim 1, in which said valve elements are of elliptical or oval cross-section.

5. A rotary pump according to claim 1, in which said valve elements are of pear-shaped cross section.

6. A rotary pump according to claim 1, in which said valve elements are formed each by two rolls of different diameters.

References Cited

UNITED STATES PATENTS

| | | | |
|---|---|---|---|
| 855,590 | 6/1907 | Ripberger | 91—123 |
| 929,018 | 7/1909 | Ripberger | 91—123 |
| 1,749,058 | 3/1930 | Barlow | 103—136 |
| 2,065,008 | 12/1936 | Madle | 103—136 |
| 2,159,941 | 5/1939 | Guinness | 103—136 |
| 2,635,550 | 4/1953 | Granberg | 103—136 |
| 3,253,546 | 5/1966 | Cook | 103—136 |

DONLEY J. STOCKING, Primary Examiner.

W. J. GOODLIN, Assistant Examiner.

U.S. Cl. X.R.

103—140, 117